United States Patent
Neubauer

(10) Patent No.: US 10,759,613 B2
(45) Date of Patent: Sep. 1, 2020

(54) LINEAR TRANSPORT SYSTEM WITH MINIMAL TRANSPORT SPACING

(71) Applicant: KRONES AG, Neutraubling (DE)

(72) Inventor: Michael Neubauer, Grassau (DE)

(73) Assignee: Krones AG, Neutraubling (DE)

( * ) Notice: Subject to any disclaimer, the term of this patent is extended or adjusted under 35 U.S.C. 154(b) by 84 days.

(21) Appl. No.: 16/061,315

(22) PCT Filed: Dec. 8, 2016

(86) PCT No.: PCT/EP2016/080193
§ 371 (c)(1),
(2) Date: Dec. 3, 2018

(87) PCT Pub. No.: WO2017/108423
PCT Pub. Date: Jun. 29, 2017

(65) Prior Publication Data
US 2019/0100389 A1 Apr. 4, 2019

(30) Foreign Application Priority Data
Dec. 21, 2015 (DE) .......... 10 2015 226 139

(51) Int. Cl.
*B65G 54/02* (2006.01)
*H02K 41/03* (2006.01)
(Continued)

(52) U.S. Cl.
CPC .......... *B65G 54/02* (2013.01); *H02K 7/08* (2013.01); *H02K 41/031* (2013.01); *B60L 13/10* (2013.01)

(58) Field of Classification Search
CPC ........ B65G 54/02; H02K 7/08; H02K 41/031; B60L 13/10
See application file for complete search history.

(56) References Cited

U.S. PATENT DOCUMENTS 5,197,391 A * 3/1993 Shimada ............... B65G 54/02
5,749,131 A    5/1998 Breil et al.
(Continued)

FOREIGN PATENT DOCUMENTS

DE    1 951 0281 C1    12/1995
DE    2013 218 389 A1    3/2015
JP    H10-17125 A    1/1998

OTHER PUBLICATIONS

International Search Report and Written Opinion for International Application No. PCT/EP2016/080193 dated Mar. 30, 2017, 9 pages.
(Continued)

*Primary Examiner* — Gene O Crawford
*Assistant Examiner* — Keith R Campbell
(74) *Attorney, Agent, or Firm* — Lowenstein Sandler LLP

(57) ABSTRACT

A transport system includes a transport track with a long stator of a linear motor and a plurality of transport elements for transporting containers. The transport elements are disposed movably on the transport track and have respectively a secondary part for magnetic interaction with the long stator. At least one sequence of magnets is arranged on the secondary part such that the respective transport element can be moved through magnetic interaction of the magnets with the long stator along the transport direction. An extension of at least the first and the last magnet in each sequence is reduced in a way that, and an arrangement of at least the first and the last magnet is chosen in a way that, the magnets of adjacent sequence ends of two successive transport elements occupy overlap-free areas in a direction that is perpendicular to the transport direction.

17 Claims, 10 Drawing Sheets

(51) Int. Cl.
    *H02K 7/08*          (2006.01)
    *B60L 13/10*         (2006.01)

(56)                References Cited

U.S. PATENT DOCUMENTS

| | | |
|---|---|---|
| 8,502,422 B2 | 8/2013 | Lykkegaard |
| 8,616,134 B2 * | 12/2013 | King ........................ B60L 13/06 |
| 9,056,720 B2 * | 6/2015 | van de Loecht ....... B65G 17/06 |
| 9,617,089 B2 | 4/2017 | Josefowitz et al. |
| 10,189,655 B2 * | 1/2019 | Pradelli ..................... B61B 3/02 |
| 2010/0186618 A1 | 7/2010 | King et al. |
| 2012/0145500 A1 | 6/2012 | Staunton et al. |
| 2014/0142792 A1 | 5/2014 | Hanaka et al. |
| 2015/0083013 A1 | 3/2015 | Clark et al. |
| 2019/0256302 A1 * | 8/2019 | Neubauer .............. B65G 54/02 |

OTHER PUBLICATIONS

Search Report for German Patent Application No. 10 2015 226 139.5 dated Sep. 20, 2016, 10 pages.

* cited by examiner

LINEAR TRANSPORT SYSTEM WITH MINIMAL TRANSPORT SPACING

RELATED APPLICATIONS

This application claims the benefit of International Application No. PCT/EP2016/080193, filed Dec. 8, 2016, that claims priority to German Application No. 102015226139.5, filed Dec. 21, 2015. The entire contents of both applications are hereby incorporated by reference.

FIELD OF THE INVENTION

The present disclosure relates to a device for controlled moving of individually controllable transport elements for the transport of containers, packages, labels, closures or other packaging means, in particular of bottles or cans, in a facility for treatment of the containers.

BACKGROUND

Transport systems with a linear motor drive, i.e. so-called linear transport systems, are well known in the state of the art. The most prominent example is high-speed passenger trains on the basis of magnetic levitation technology. Transport systems with a linear motor drive, however, are also used in many industrial fields, in particular for the individual transport of piece items within production lines.

For example a linear transport system with a plurality of magnetic rotors for the transport of bottles in a container treatment facility are described in the DE 10 2013 218 389 A1. The rotors that transport the bottles thereby move while being driven by the magnetic interaction between a secondary part of the rotors that carry a permanent magnet and/or electromagnets and two long stators along two guiding rails that are guided in parallel and that are connected to the respective long stator. In this context, the rotors are installed on the guiding rails by means of rollers and generally have a chassis with a rectangular form on the level of the roller bearings, wherein roller pairs, which are only spaced at a small distance from one another, actuate on the respective guiding rail in the longitudinal direction of the rotors.

In practice, contradictory requirements arise for the design of the rotors. On one hand, the rotors should have the largest possible extension in the longitudinal direction, i.e. in the movement direction, in order to reduce wear and stress of the bearing elements, i.e. generally the rollers. In addition, the rollers can be formed smaller for a long rotor than for a short rotor. Alternatively, the rotor can take more load if the bearing elements are formed with equal dimensions.

Conversely, it is desirable to form the rotors as short as possible so that the spacing of the containers or objects transported by said rotors in the container flow that is being formed, i.e. the so-called transport spacing, is as small as possible and that consequently the throughput of containers per time unit of a container treatment facility that actuates the transport system can be as high as possible. When each rotor transports exactly one container, for example the minimum attainable spacing will arise if successive rotors drive up to contact. This minimum attainable spacing therefore corresponds to the maximum longitudinal extension of the rotors as long as the containers are smaller than the rotors. Likewise, a small longitudinal extension of the rotors is desirable in order to be able to take up small containers from a transport belt at a transition point in the accumulated state.

In determining the maximum attainable transport spacing, the extension of the chassis of the rotors is generally the limiting factor as said chassis determines the position and/or the spacing of the bearing elements, for example of the rollers. In addition, however, also the extension of the secondary part in the transport direction, which usually has a carrier plate with magnets installed on it, can restrict a reduction of the minimum attainable transport spacing. For example, the extension of the magnets in the transport direction is predetermined by the design of the coils of the long stator and can therefore not be reduced at random, wherein usually a sequence of multiple magnets that are polarized in an alternating way is provided in the movement direction, i.e. longitudinal direction, of the rotors in order to achieve an optimal propulsion force. The longitudinal extension of this sequence thereby defines the maximum realizable longitudinal extension of the secondary parts and therefore sets a lower limit for the maximum attainable transport spacing.

In practice, the maximum attainable transport spacing is even clearly greater than this longitudinal extension of the secondary parts because the secondary parts of rotors that succeed one another directly would, depending on the polarity of the magnets of the adjacent sequence ends, either attract or reject each other strongly in case of a too close approximation. In both cases, the arising forces would exceed the propulsion force of the linear motor by far so that a controlled movement of the rotors would no longer be possible. For this reason, a sufficiently large gap will always remain between the secondary parts of successive rotors in practice.

DETAILED DESCRIPTION

Figure 1:
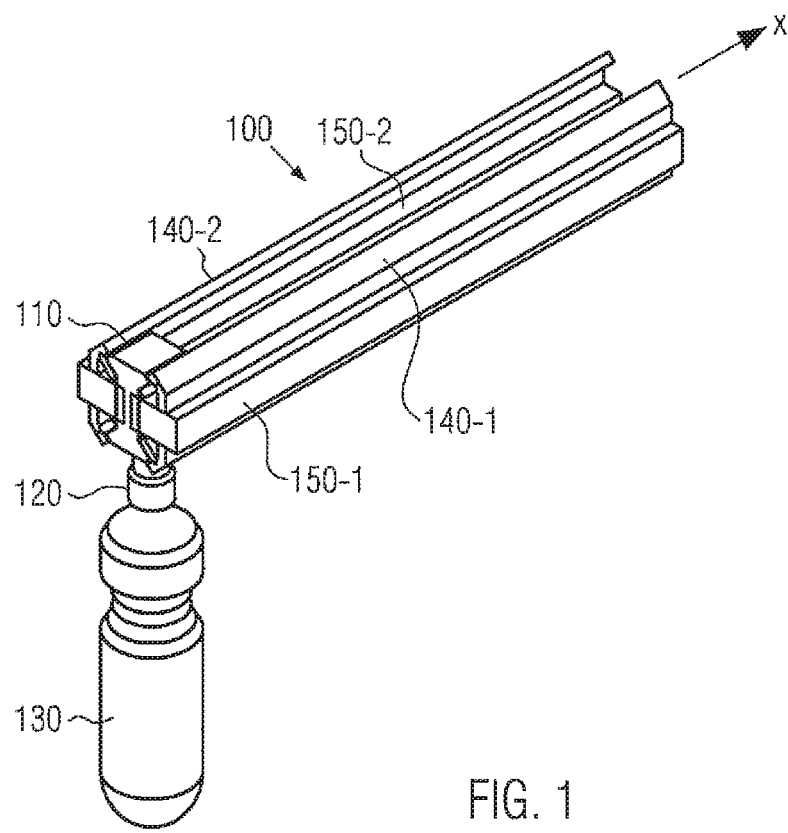
FIG. 1 shows an exemplary transport system with a two-sided linear motor and transport element as it is known in the state of the art.

It is desirable for certain applications, in particular in the beverage-processing industry, to achieve a division spacing that is as small as possible between two rotors. For example, it is desirable to guide the preforms of plastic bottles, for example PET bottles, to an infrared oven with a stretch-blowing machine with a division spacing of 36 mm or less. But this is not possible with the secondary parts known up to present with a longitudinal extension of 45 mm or more.

Hence, the present disclosure is based on the purpose of providing a linear transport system that allows for a transport spacing that is as small as possible without having negative effects for the controllability of the rotors. In addition, wear and stress of the bearing elements of the rotors should be reduced. In general, embodiments of the present disclosure are based on the problem of increasing the throughput of a linear transport system while ensuring a low maintenance workload at the same time.

The problems mentioned above are solved by a transport system for the transport of containers in a container treatment facility with a transport track with at least one long stator of a linear motor and a plurality of transport elements for transporting one or multiple containers, wherein the transport elements are arranged movably on the transport track and have respectively at least one secondary part for magnetic interaction with the at least one long stator, wherein at least one sequence of permanent magnets and/or electromagnets with an alternating polarity is arranged on the secondary part in such a way that the respective transport element can be moved through magnetic interaction of the magnets of the sequence with the long stator along the transport track and wherein an extension at least of the first and the last magnets in each sequence can be reduced in such a way and wherein an arrangement of at least the first and the last magnet on the respective secondary part is chosen in such a way that the magnets of adjacent sequence ends of two successive transport elements occupy areas that do not overlap with one another in a perpendicular direction to the transport direction.

In container treatment facilities, containers such as bottles, cans, etc. are treated in one or multiple successive process steps. In this, the process steps and/or work steps are generally performed in separate treatment units that can be composed for example as modules of a joint facility concept. A container treatment facility for plastic bags, e.g. made of polyethyleneterephtalate (PET), polypropylene (PEP), etc. can for example comprise a heating device for heating the preforms, a stretch-blowing device for expanding and stretching the preforms into plastic bottles, a cleaning device, a sterilization device, an inspection device, a tempering device, a cooling device, a coating device, a buffer device, etc. as separate treatment units that are designed in a modular form. The individual treatment units, which comprise successive process steps, are thereby generally disposed successively in a row, wherein one or multiple transport devices perform the transport of the containers from the treatment units to the respective downstream treatment units.

The present disclosure relates to such a transport system for the transport of containers in a container treatment facility. For transport of the containers along a process track in a container treatment facility, the transport system according to embodiments of the disclosure comprise a plurality of transport elements for transporting one or multiple containers, wherein the transport elements are arranged movably on a transport track of the transport system. In this context, there can be any number of transport elements on the transport track, and this number is only limited by the length of the transport track. For the intake of at least one container at an input and for the discharge of the containers at an output, the transport elements can be equipped with an appropriate holding device for holding one or multiple containers, e.g. in form of a gripping element. In this context, the gripping element can be designed in a way as to be controllable passively or actively. In particular, gripping elements for form-fitting or force-fitting gripping of a neck area of the containers, e.g. of the so-called neck ring for neck handling of plastic bottles, are conceivable, wherein the held container can be arranged rotatably around its longitudinal axis in the gripping element during form-fitting gripping. In addition, the gripping element can be formed in a tiltable and/or height-adjustable way.

Containers are in particular beverage bottles but also other containers for foodstuffs, medicines, hygiene articles, cleaning agents or the like such as cans, glass bottles or other glass containers with a lid, packagings on the basis of cardboard or composite materials, tetra pack or the like. Likewise, also intermediate products, in particular preforms for stretch-blowing of the containers, are conceivable for plastic containers. Furthermore, also composed packages with multiple containers shall be understood as containers.

The transport elements can be formed as a rotor, puck, sledge, shuttle or the like that can be moved according to the disclosure through magnetic interaction with at least one long stator of a linear motor, i.e. one linear motor string, of the transport track along the transport track. Each transport element can in this context be accelerated, slowed down, moved at a constant velocity or also be stopped completely for a certain time on the transport track as needed. Through individual control of the transport element, a variable path-time profile of each transport element can therefore be implemented.

According to embodiments of the disclosure, the transport track of the transport system has at least one, preferably even two long stators of a linear motor. The form of the transport track is random in this context as a matter of principle. In particular, the transport track can essentially be closed, wherein essentially closed means that the transport track enables at least one closed path for the transport elements. In addition, the transport track can have a random number of ramifications through inserting one or multiple switches.

Furthermore, the transport track can have at least one guiding rail on which the transport elements are arranged movably by means of one or multiple bearing elements. In particular, the transport track can have two guiding rails, which are guided in parallel, in form of a double-rail system such as in case of railway tracks. The long stator(s) can in this context be arranged in parallel to the respective guiding rails or, for example in a centered way, between said guiding rails. A plurality of embodiments of the guiding rails and long stators is known in the state of the art.

The form and the cross-section of the guiding rails are in this context at random and only determined by the design of the transport elements as well as the bearing elements of the transport elements by means of which the transport elements are installed movably on the guiding rails. For example, each guiding rail can have a guiding channel in which a guiding pin of the transport element is guided, and/or a wheel flange on which one or multiple guiding rails, which are disposed appropriately, roll off. A plurality of alternative embodiments, e.g. by means of a slide bearing, is possible in this case. By means of providing guiding rails on the transport rail, a low-friction movement of the transport elements along the transport track can be enabled. In addition, the transport track can have a running surface on which appropriate support elements, e.g. support rollers, can roll off and/or slide.

According to embodiments of the disclosure, each of the transport elements has at least one secondary part for magnetic interaction with the at least one long stator. For this purpose, at least one sequence, i.e. sequence in the longitudinal direction of the transport element, of generally adjacent permanent magnets and/or electromagnets, in particular non-switching electromagnets, of alternating polarity is installed on the secondary part that can be formed for example in form of a carrier plate. Depending on the form and arrangement of these magnets and depending on whether a one-sided or a two-sided linear motor drive is used, the transport elements can also have two or multiple secondary parts. For example, a separate secondary part can be provided for each long stator. In this case, the arrangements of the sequences of magnets on the secondary parts can be equal or different, in particular mirrored. Also, the parts of the sequences described below, which occupy different areas in a perpendicular direction to the transport direction, can be disposed on different secondary parts. To simplify the illustration, transport elements are indicated with exactly one secondary part here and in the following without restriction. In a particular case, the sequence can also have only one single magnet with a determined polarity. In this case, the sequences of the secondary parts of successive transport elements occupy areas without any overlap and in a perpendicular direction to the transport direction.

The at least one long stator can in particular be formed as a synchronous linear motor. In an alternative embodiment, the long stator can also be formed as an asynchronous linear motor, wherein at least one permanent magnet and/or non-switching electromagnet of the secondary part of the transport elements and/or an electrically conductive element of the transport elements, e.g. in form of a metallic plate, on which the permanent magnet and/or non-switching electromagnet are installed, can work as electric conductors for the induction through the asynchronous linear motors. For the magnetic interaction with the at least one long stator, the transport elements can, as mentioned, have a secondary part that is equipped with at least one sequence of permanent magnets and/or electromagnets, in the following referred to as magnets of the secondary part in short, wherein the secondary part is formed in a way that the respective transport element can be moved through magnetic interaction with the at least one long stator of the transport track along the transport track.

In a particularly simple embodiment, the at least one long stator of the linear motor can be formed by a plurality of electric windings in form of electromagnets that can be controlled individually or as a block and that are arranged along the linear motor string. In this context, more complex embodiments, e.g. by means of a Halbach array of the electromagnets to reinforce the magnetic flow on the side that faces the secondary part, are also conceivable. The transport element can be formed as a passive transport element that is moved via a secondary part with at least one sequence of permanent magnets and/or non-switching electromagnets through interaction with the electromagnetic alternating fields that are generated by the individually controllable electromagnets of the linear motor. A non-switching electromagnet is in this context connected with a power source and/or a regulating unit of the transport system in a way that it is always passed by a preferably controllable electric current in the same direction. Alternatively, the transport element as an active transport element can be equipped with electric windings, i.e. a sequence of switching electromagnets that can apply the magnetic alternating fields that are necessary for the drive. Accordingly, the at least one long stator of the transport track is equipped in this embodiment with permanent magnets and/or non-switching electromagnets.

In one embodiment, the magnets of the at least one sequence can be arranged on the secondary part of the transport element with a transversal orientation to the transport track so that respectively one of the magnetic poles of each magnet can interact with a first long stator while the other magnetic pole can interact with a second long stator. Alternatively, the sides of the secondary part that face the first long stator and the second long stator, however, can also have separate sequences of magnets that can in particular be formed in a Halbach array to reinforce the magnetic flow in the direction of the respective linear motor string. In addition, also an embodiment with only one long stator is conceivable, wherein the magnets of the secondary parts can be disposed in particular in a Halbach array. A supply of the at least one non-switching electromagnet of the secondary part of the transport element with the required electric energy can be achieved via an electric line that is disposed along the transport track or a power supply rail and via electric contacts of the transport element, e.g. via power collection shoes. Alternatively, a transmission of the required electric energy via induction is conceivable.

In linear motors, the magnets of the transport element and the long stator(s) are generally aligned and dimensioned in such a way that they are opposite to one another on both sides of an air gap, wherein the aim is generally to achieve an overlap that is as large as possible of the magnetic poles that are opposite to one another in the direction that is perpendicular to the transport and/or movement direction and along the air gap in order to achieve an optimal propulsion force. In this context, two basic configurations for the orientation and relative arrangement of guiding rail(s), long stator(s) and the secondary part are conceivable.

In a first embodiment, guiding rail(s), long stator(s) and the secondary part are arranged in a way that the air gap between the poles of the magnet of the secondary part and the long stator is aligned essentially perpendicularly to a contact surface of the transport system and/or the container treatment facility. In this "vertical" case, the poles of the magnets of the long stator and the secondary part that generally have a longish form are also aligned essentially perpendicularly. The same applies for a carrier plate of the secondary part. The movement direction and the course of the at least one guiding rail is thereby assumed to be essentially horizontal, i.e. parallel to the contact surface. In one two-sided linear motor, the two long stators extend in addition in parallel to one another in a horizontal plane.

In a second alternative embodiment, the guiding rail(s), long stator(s) and secondary parts are disposed in a way that the air gap that exists between the poles of the magnets of the secondary part and the long stator is essentially aligned in parallel to the contact surface of the transport system and/or the container treatment facility. In this "horizontal" case, the poles of the magnets of long stator and secondary part, which are generally formed in a longish way, are essentially aligned horizontally as well. The same applies for a carrier plate of the secondary part. The movement direction and the course of the at least one guiding rail is also assumed to be essentially horizontal in this context, i.e.

parallel to the contact surface. In a two-sided linear motor, however, the two long stators extend in parallel to one another in a vertical plane.

In both embodiments, the movement of the transport elements occurs in a horizontal plane. However, it is clear that the transport track mentioned above can also comprise gradients and even vertical section parts. Accordingly, the relative arrangements of guiding rails, long stators and secondary parts have to be adapted to the orientation of the transport track. For the sake of simplicity of the descriptions, a horizontally aligned transport track will be assumed without restriction in the following. However, it is clear that the terms "vertical", "parallel" and "horizontal" used in the following do not define an absolute reference system but shall be understood in relation to the orientation of the transport track if nothing else is indicated explicitly.

As mentioned, an overlap that is as large as possible of poles that are located opposite to one another in a perpendicular direction to the transport direction, i.e. in parallel to the two-dimensional extension of the air gap and perpendicular to the transport direction, is usually provided in the state of the art in order to maximize the magnetic interaction. According to the present further development, however, an extension of at least the first and the last magnet is reduced in each sequence of magnets of the secondary parts of the transport elements in relation to this usual overlap, and an arrangement of at least the first and the last magnet on the respective secondary part is chosen in such a way that the magnets of adjacent sequence ends of two successive transport elements occupy overlap-free areas in a perpendicular direction to the transport direction.

In this context, two successive transport elements are directly adjacent transport elements along the transport track. As the sequences of the magnets of the secondary parts of the transport elements are oriented in the transport direction, at least the magnets of two adjacent sequence ends, i.e. the end magnets of the respective sequences, are thereby adjacent to one another in the transport direction. Hence, their arrangement is, besides the formation of the carrier plate of the secondary part, decisive for the minimal attainable transport spacing. If the secondary parts have respectively more than one sequence of magnets, for example two sequences that are located "on top of one another" in a perpendicular direction to the transport direction, the above statement of the overlap-free areas shall apply accordingly.

Due to the extension of their poles in a perpendicular direction to the transport direction, the magnets occupy respective areas that are perpendicular to the transport direction. In other words, the extensions of the magnets perpendicular to the transport direction correspond to relevant areas on an axis perpendicular to the transport direction. In the above "vertical" case, these areas are vertical areas whereas they represent horizontal areas respectively in the above "horizontal" case. A complete overlap of the areas of two adjacent end magnets would consequently mean that the poles of these end magnets are opposite to one another along their entire extension in a direction that is perpendicular to the transport direction. A partial overlap of the areas of two adjacent end magnets would therefore still correspond to an arrangement perpendicular to the transport direction in which the poles of the magnets are in part opposite to one another.

According to embodiments of the disclosure, however, at least the first and the last magnet of each sequence are arranged on the respective secondary part in such a way that the adjacent end magnets occupy overlap-free areas that are perpendicular to the transport direction. Consequently, the poles of adjacent end magnets are not located opposite to one another and therefore do not restrict each other either, neither due to undesired magnetic interaction nor mechanically. In particular, the occupied areas can have a distance of 1 mm, preferably of 5 mm, particularly preferably of 10 mm in a perpendicular direction to the transport direction in order to enable the secondary parts to "drive into one another" without excessive magnetic interaction of the adjacent end magnets.

The described arrangement of at least the first and the last magnet on the secondary parts enables underscoring of the usual minimum distance between successive transport elements by means of aligning for example the first magnet of a trailing transport element to the last magnet of a leading transport element in a direction that is offset perpendicularly to the transport direction, i.e. in a way that said first magnet will be positioned "above" or "below" said last magnet when viewed from a direction that is perpendicular to the transport direction. The carrier plates of the two secondary plates can be formed in this context in a way that this process of driving into one another of the sequences of magnets of adjacent secondary parts is possible without any blockade by the carrier plates. In case of suitable formation of the chassis units of the two transport elements, a minimal transport spacing, which is significantly smaller than in case of the usual transport elements (see below), can therefore be achieved.

The transport elements can be guided along the transport track by means of a control and/or regulating unit, e.g. in form of a process computer. The control and/or regulating unit can thereby be implemented as a central control and/or regulating unit of the transport system and/or also by means of control and/or regulating units that are disposed in a decentralized way on the transport elements. In addition, the one or multiple control and/or regulating units can be formed as memory-programmable control unit(s). Through systematic controlling of individual electromagnets and/or individual blocks of electromagnets of the at least one long stator in a limited area of the transport track, a specific transport element can be accelerated systematically and therefore moved so that the transport element can be guided along the transport track individually and independently of other transport elements of the plurality of transport elements of the transport system. This also enables the above-mentioned process of the secondary parts of successive transport elements driving into one another. But as the sequences of magnets of these transport elements cannot be driven completely into one another, each of the transport elements can always be driven back out of the tight position by means of appropriate controlling of individual electromagnets of the long stators. For this purpose, for example the electromagnets of the long stators that correspond to the magnets in an aligned position can be deactivated while the electromagnets that correspond to the remaining magnets can cause an acceleration of the leading and/or a delay of the trailing transport element. This way, trains of successive transport elements formed before can be decomposed once again.

In this context, controlling of the electromagnets of the long stator occurs by means of the control and/or regulating unit of the transport system. In particular, the voltage through the electric windings of the electromagnets of the long stator can be regulated individually by the control and/or regulating unit and automatically as a function of a force requirement of the transport element to be moved. Through individual controlling and/or regulating of the voltage through individual windings of the linear motor strings, the transport element can be accelerated, slowed down or moved with a constant predetermined velocity.

Depending on the design of the guiding rail, the secondary part and/or the at least one long stator, the transport elements can be installed on the transport track in a completely mechanical or partially magnetic and partially mechanical way. In case of a partially magnetic installation, the transport track is formed in a way that the magnetic interaction between the secondary part of the transport element and the long stator causes a partially magnetic levitation of the transport element and hence reduces the mechanical stress of the bearing elements. In addition, the transport elements are equipped in this context with one or multiple support elements, e.g. in form of support rollers or and/or guiding rollers that roll off on the at least one guiding rail. Likewise, a partially or completely mechanical installation by means of at least one slide bearing is possible. A design of the installation of the transport elements by means of slide bearings that are in contact with the guiding rail is particularly cost-efficient. Additional support elements and/or slide bearings can thereby roll and/or slide on an additional running surface of the transport track. In case of a completely mechanical installation, the transport element can be installed exclusively with the described support elements and/or slide bearings.

For individual control of the transport elements along the transport track, the positions of the transport elements on a section of the transport track can be determined by means of regular and periodic arrangement of sensors along at least said section of the transport track. In this context, the sensors can be formed as an optical sensor, electric sensor, electromagnetic sensor or mechanical sensor wherein the position of the transport elements in the area of the sensor can be determined for example by means of measuring a light reflection on a reflector element of the transport elements, through induction of an electromagnetic signal due to the movement of the transport elements, through modification of the electric resistance of the sensor by taking advantage of a magneto-resistive effect, e.g. due to the magnetic flow of a magnetic reference element, in particular of a permanent magnet, or of the secondary part of the transport elements, or through local pressure measurement due to the weight of the transport elements.

According to a further development, the plurality of transport elements can comprise at least a first and a second group of transport elements, wherein the magnets of at least the sequence ends of the secondary parts of the transport elements of the first group occupy a first area, and wherein the magnets of at least the sequence ends of the secondary parts of the transport elements of the second group occupy a second area that is free of overlaps with the first area. According to this further development, at least the first and the last magnet of the sequence of a transport element of the first group therefore occupy the first area whereas at least the first and the last magnet of the sequence of a transport element of the second group occupy the second area. In case of an alternating arrangement of transport elements of the first and the second group on the transport track, successive transport elements can therefore always be driven into one another at least to the extent that adjacent sequence ends overlap by at least one magnet in the direction that is perpendicular to the transport direction.

According to a special further development, all magnets of the secondary parts of the transport elements of the first group can occupy the first area and all magnets of the secondary parts of the transport elements of the second group can occupy the second area. In this case, the sequences of magnets of the transport elements of different groups consequently occupy different areas perpendicularly to the transport direction. This is in particular the case when the sequences have each only one single magnet. Accordingly, this can also apply for more than two groups with respectively more than two areas. Depending on the formation of the carrier plates of the secondary parts, the sequences of adjacent transport elements can be driven on top of one another by more than one magnet.

According to an alternative further development, the number of the magnets can be uneven in each sequence, wherein respectively at least the central magnet of each sequence of the secondary parts of the transport elements of the first and the second group occupies at least the first and the second area. In particular, the central magnet can have the usual expansion in a perpendicular direction to the transport direction that allows for a complete overlap with the poles of the respective long stator. Depending on the number of magnets in the sequence, also three, five, etc. magnets can have such an extension. The central magnets of the sequences are therefore formed to be longer that the magnets of the sequence ends in a perpendicular direction to the transport direction. For example, the extension of the central magnets can be 50 mm while the extension of the magnets of the sequence ends amounts to only 22.5 mm Due to the larger extension of the central magnet(s), the effective propulsion force can be increased so that an increase of the performance data of the transport system can be achieved.

According to a further development, the magnets of one sequence end of each sequence of the secondary parts of the transport elements can occupy a first area, and the magnets of the other sequence end can occupy a second area that is free of overlaps with the first area. The sequences of the transport elements therefore have respectively one end magnet that occupies the first area as well as an end magnet that occupies the second area. Also, respectively two or multiple magnets can occupy the first and/or second area on the sequence ends. The arrangement of the magnets on the secondary part is consequently step-shaped or z-shaped. In case of an identically aligned arrangement of all transport elements on the transport track, any transport elements can therefore be discharged of the flow of transport elements or inserted into said flow without influencing the minimal attainable transport spacing.

According to a special further development, the number of magnets can be uneven in every sequence, wherein respectively at least the central magnet of each sequence of the secondary parts of the transport elements occupies at least the first and the second area. Also here, the step- and/or z-shaped arrangement of the magnets is possible, wherein the central magnet(s) extend as described above at least over both areas in order to increase the propulsion force. Also here, transport elements can be discharged and inserted in any way without influencing the minimum attainable transport spacing of a transport flow.

In a special case, exactly the central magnet can occupy at least the first and second area, wherein the magnets between the central magnet and one sequence end occupy the first area, and wherein the magnets between the central magnet and the other sequence end occupy the second area. Hence, all magnets except the central magnet occupy either the first or the second area. This configuration allows for a particularly robust transport system with a high propulsion force and a high selectivity of the control.

According to a further development, the at least one long stator can have two or more linear motor strings that correspond to the overlap-free areas, that are arranged in parallel and that can be controlled independently of one another. The electromagnets of these linear motor strings, i.e. their poles, therefore extend perpendicularly to the transport direction over overlap-free areas that correspond to the abovementioned first and second areas and that can in particular overlap completely with said areas. Hence, the electromagnets of one linear motor string are located opposite to the magnets of the sequences that occupy the first area while the electromagnets of the other linear motor string are located opposite to the magnets of the sequences that occupy the second area. As the linear motor strings can in addition be controlled independently of one another, propulsion and/or deceleration forces can also be applied independently of one another to the magnets of the sequences in different areas. This way, the magnets of adjacent sequences of successive transport elements that are located "on top of one another" in an aligned position can be influenced independently of one another so that trains of two or more transport elements can be formed and decomposed again in a simple manner.

An alternative or supplementary further development can comprise a mechanical acceleration unit, in particular a driven roller or a driven conveyor belt that is arranged on the transport track in such a way that passing transport elements can be accelerated or slowed down systematically by means of mechanical encroachment with the acceleration unit. For this purpose, the transport elements can have a respective surface element that can be brought into mechanical encroachment with the acceleration unit, for example by switching the acceleration unit more closely towards the transport path. Through friction with a driven roller or a driven conveyor belt, the transport element that encroaches with the acceleration unit can be accelerated or slowed down systematically so that a train of transport elements can be decomposed again.

According to a further development, the front and back sides as well as the secondary parts of the transport elements can be formed in such a way that the transport elements can be driven into one another to the extent that a minimal attainable transport spacing arises that is smaller than the longitudinal extension of the transport elements. The front side of a transport element shall be understood here and in the following as the side of the transport element that is aligned in the movement direction. Accordingly, the back side shall be understood as the side of the transport element that faces away from the movement direction. Although the transport elements can generally be moved both forwards as well as backwards along the transport track by means of the abovementioned control unit, a preferred transport direction arises due to the process flow of the container treatment facility and the arrangement of the transport track in the container treatment facility so that front and back sides of the transport elements disposed on the transport track are well defined. Depending on the embodiment, however, the transport elements can also be arranged on the transport track in a way as to be rotated by 180 degrees. In this case, the rollers of the front and back side are interchanged but without affecting the validity of the abovementioned proportion of these two sides.

The minimal attainable transport spacing is defined by the distance of reference points of successive transport elements that correspond to one another, for example the centers of gravity of conveyed containers and/or the transport elements that can be achieved by guiding the successive transport elements as closely as possible to one another, in the extreme case in a way that they are in contact with one another. According to the embodiments of the disclosure, said distance is smaller than the longitudinal extension of the transport elements due to the respective formation of the front and back sides as well as the secondary parts of the transport elements. Here and in the following, the longitudinal extension of the transport elements shall be understood as the maximal extension of the transport elements in the transport direction. More specifically, the front and back sides as well as the secondary parts of the transport elements are formed in a way that the transport elements can be driven into one another at least in pairs. For example, the front and the back sides as well as the secondary parts of the transport elements can be formed in a way that the front side and the secondary part of a trailing transport element and the back side and the secondary part of a transport element that runs directly ahead can be driven into one another. This means that protruding parts of the front side and of the secondary part of the trailing transport elements can be driven into appropriate recesses of the back side and of the secondary part of the leading transport element and/or that protruding parts of the back side and of the secondary part of the leading transport element can drive into appropriate recesses of the front side and of the secondary part of the trailing transport element. The front and back sides as well as secondary parts of successive transport elements are consequently formed in a bundled manner in such a way that they can be driven into one another in an interlocking way. For example, the contour of the front side in a section of the trailing transport element that corresponds to the transport plane can fit into the contour of the back side in such a section of the leading transport element. Likewise, the contour of the front side of the secondary part of a trailing transport element can fit into the contour of the back side of the secondary part of a leading transport element. The process of driving into one another takes place without deformation of the transport elements and can in particular occur without mechanical contact of the transport elements.

In the simplest case, all transport elements are formed in such a way that this proportion of front and back side applies for the front and back side and the secondary part of every single transport element itself. In particular, the chassis of the transport elements are therefore not formed mirror-symmetrically in relation to a plane that is transversal to the transport direction. A more complex case arises when the proportion of front and back side relates exclusively to the front side of a trailing transport element and to the back side of a leading transport element. In this case, pairs of transport elements can respectively be driven into one another to the extent that the minimal attainable transport spacing is smaller than their longitudinal extension. A special case of this formation, in which successive transport elements are arranged in a way that they are rotated by 180 degrees towards one another, is described further below. In the similar formation of the transport elements that is mentioned first, however, entire trains and/or chains of transport elements with a minimal transport spacing can be formed. The formation mentioned first can consequently be combined in combination with the shifted arrangement of the magnets of adjacent sequence ends.

According to a further development, the transport elements can have bearing elements, in particular rollers, which are respectively spaced from one another in the longitudinal direction and by means of which the transport elements are installed movably on the transport track, in particular on the at least one guiding rail mentioned above, wherein the minimal attainable transport spacing is smaller than the maximum distance of these bearing elements in the longitudinal direction. For this purpose, the bearing elements can in particular be disposed on appropriate protruding parts of the front and back sides of the transport elements. In particular, the bearing elements, for example rollers, can be installed on the maximally protruding parts of the transport elements. In order not to hamper one another, the rollers of the front side can be installed in a way as to be tilted by 90 degrees in relation to the rollers of the back side. Alternatively, the rollers of the front side can encroach on an inner side of a guiding rail whereas the rollers of the back side encroach on the outer side of the guiding rail, or vice versa, wherein the inner and outer sides are defined in relation to the center line of a double rail system.

By means of increasing the spacing of the bearing elements, the transport elements can assume substantially higher loads. For example, the transport elements are much more resistant to forces that act perpendicularly to the movement direction as they can arise for example in case of a torque onto the transport element due to the container treatment. The bearing elements are stressed less in case of a larger spacing. If the transport elements are held themselves on the transport track due to the magnetic interaction, the operating safety will increase due to the increased spacing as the transport elements can be held more safely on a guiding rail. In case of a constant roller spacing, however, the transport elements according to embodiments of the disclosure allow for a smaller transport spacing and therefore a higher throughput of containers per time unit. As the transport in container treatment facilities often becomes the limiting factor for the throughput, the described further developments make the use of linear transport systems in the beverage-processing industry more competitive.

According to a special further development, the secondary parts of the transport elements can be formed in such a way, and the magnets of the secondary parts of successive transport elements can be disposed on the respective secondary part in such a way that the secondary part of a trailing transport element can be driven towards the secondary part of a leading transport element to the extent that the magnets of the adjacent sequence ends are aligned in a perpendicular direction to the transport direction. As already described above, this means that the magnets of adjacent sequence ends can be driven over one another so that they are in alignment with one another, in particular in a flush manner Due to the abovementioned distance between the overlap-free areas, there will not be any undesired strong magnetic interactions in this process that could have a negative influence on the control of the transport elements. The secondary parts, in particular their carrier plates, could essentially be formed in a way that, although they hold the respective sequences of magnets safely, they do not occupy any other space that would be required for the process of driving into one another of the secondary parts of successive transport elements. Through the mentioned formation of the secondary parts, successive transport elements with appropriately formed front and back sides could be driven towards one another up to a transport spacing that is lower than the maximal longitudinal extension of the secondary parts. This way, a particularly high throughput of containers could be achieved. Likewise, particularly small containers such as preforms could be conveyed with an optimal transport spacing.

According to a further development, the transport elements can essentially be formed in a wedge-shaped or angular way, wherein successive transport elements are disposed on the transport track in a way as to be rotated by 180 degrees. This rotation of the transport elements relates in this context only to the chassis, i.e. the bearing and the secondary part, of the transport elements. Potential gripping devices or superstructures are of course oriented according to the requirements of the process track. An essentially wedge or angular form thereby means that a longitudinal side of the transport elements has a larger extension than the other longitudinal side. This way, transport elements that are rotated by 180 degrees in relation to one another can be driven into each other to the extent that the minimal attainable transport spacing is smaller than the longitudinal extension of the longer longitudinal side. In this context, the transport elements are, as mentioned above, driven into one another in pairs.

Through an alternatingly rotated arrangement of similar transport elements of this type on a transport track, also the abovementioned first and second groups of transport elements are formed automatically. Hence, all magnets of the sequence of the respective secondary part can be arranged for each transport element of the plurality of transport elements in such a way that they would occupy the same area in a perpendicular direction to the transport direction as for all other transport elements without a rotation by 180 degrees. Only the rotation causes the magnets of adjacent sequence ends of two successive transport elements to occupy overlap-free areas as described above. According to this further development, the transport elements could be manufactured in a particularly simple way.

According to an alternative further development, the transport elements can each have rollers by means of which they are supported on the transport track, wherein their arrangement in a plane of the chassis is inversion-symmetric. The roller arrangement therefore has a $C_2$ symmetry. The chassis of these transport elements is for example stair- or z-shaped and is therefore particularly stable against torques. Due to the inversion-symmetrically formed chassis, transport elements can be discharged and inserted in any way without having a negative influence on the minimal attainable transport spacing.

For this purpose, in particular also the arrangement of the magnets of the secondary parts of the transport elements can be inversion-symmetric, i.e. have a $C_2$ symmetry in relation to a rotation of the secondary parts around an axis that is perpendicular to the carrier plate. In combination with the further developments described above, this ensures that also the secondary parts have a design that is compatible with discharging and inserting of transport elements.

In addition, the transport elements can be installed on one or multiple guiding rail(s) of the transport track by means of so-called gothic rollers. Gothic rollers have a gothic running groove whose profile deviates from the circular arc shape. For this reason, gothic rollers always have two contact points with a guiding rail with a circular cross-section. An installation with gothic rollers therefore ensures particularly low friction and wear.

Alternatively, also rollers with a convex, concave or cylindrical running surface can be used. The respective guiding rails can in this context have an appropriate concave, convex or even contact profile.

The further developments described above allow for the transport elements to be moved together more closely than enabled by the longitudinal extension of the secondary parts. Therefore, very small transport spacings could be implemented, for example as required in the IR oven for stretch-blowing machines. The described further developments of the chassis allow in addition for an increased axial spacing of the bearing elements and hence a more stable installation with reduced wear.

Further features and exemplary embodiments as well as advantages of the present disclosure will be described in greater detail based on the drawings in the following. It is clear that the embodiments do not exhaust the field of the present disclosure. It is further clear that some or all of the features described in the following can also be combined with one another in a different way.

In the Figures described in the following, identical reference signs name identical elements. For the sake of better clarity, identical elements will only described when they arise for the first time. However, it is clear that the variants and embodiments of an element, which are described with reference to one of the Figures, can also applied to the respective elements in the remaining Figures.

FIG. 1 shows a three-dimensional view of a linear transport system as it is known in the state of the art and as it was described for example in the DE 10 2013 218 389 A1. The shown linear transport system 100 comprises a transport track that has a first guiding rail 140-1, a second guiding rail 140-2, a first long stator 150-1 and a second long stator 150-2. The shown transport system is therefore formed as a double-rail system with a two-sided linear motor.

Between the two guiding rails, the transport elements 110 are moved systematically by means of magnetic interaction with the long stators 150-1 and 150-2. The transport direction is denominated with X here and in the following. The shown transport element 110 transports one or multiple containers 13, shown exemplarily as a plastic bottle in this context, by means of a gripping element 120, for example a neck handling bracket. In the displayed embodiment, the plastic bottle is arranged in a suspended way below the transport element 110. However, it is clear that the transported container can also be transported in a standing or lying position on the transport element 100, where required by means of an appropriate holding device.

Figure 2:
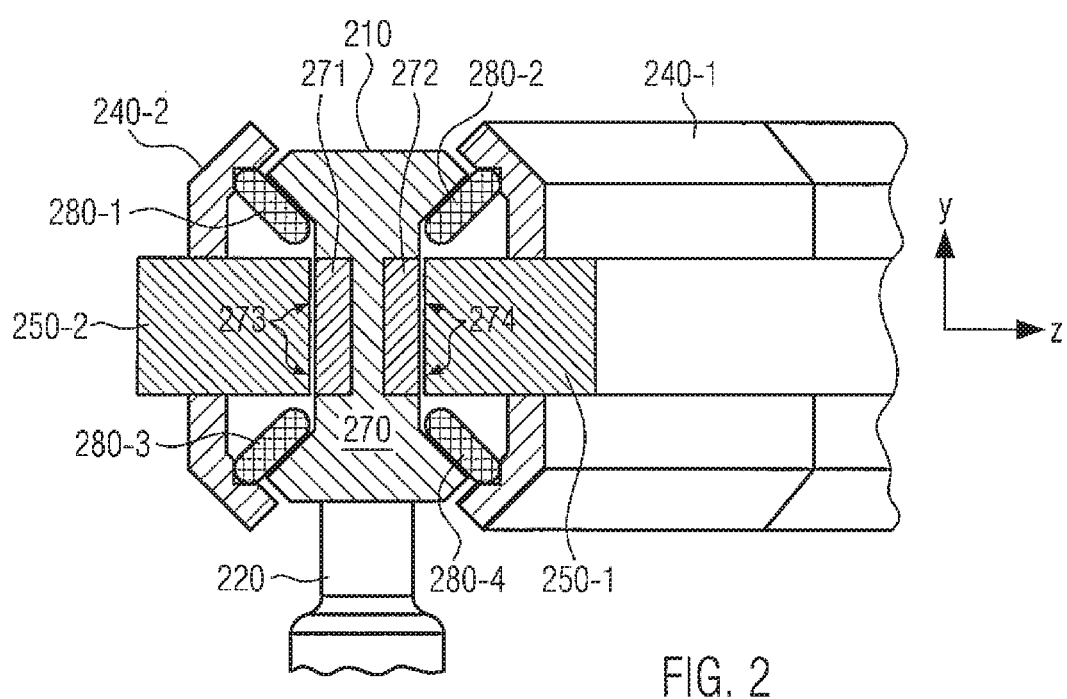
FIG. 2 shows a cross-section of the transport system shown in FIG. 1.

FIG. 2 shows a cross-section through a transport element displayed exemplarily as it is known in the state of the art. The shown transport element 210 is moved in a controlled way between two guiding rails 240-1 and 240-2, which are arranged in parallel to one another, through magnetic interaction with the long stators 250-1 and 250-2 that are fastened on the guiding rails and that extend in parallel to said guiding rails, wherein guiding rollers 280-1 to 280-4 as bearing elements of the transport element are in contact with guiding grooves that are provided exclusively for this purpose on the guiding rails 240-1 and 240-2. Alternatively, also wheel flanges or guiding channels can be used.

Besides the gripping element 220 for the container to be transported, the transport element 210 displayed herein has a secondary part 270 that is used for propulsion of the transport element along the transport track by means of interaction with the linear motor strings 250-1 and 250-2. For this purpose, the secondary part has one or multiple sequences of permanent magnets and/or non-switching electromagnets of which only two magnetic poles 271 and 272 are illustrated here in an exemplary way. In the exemplary embodiment displayed herein, the secondary part comprises on both sides sequences of permanent magnets, which are arranged in a way as to be separated from one another and which are disposed on a carrier plate. A plurality of alternative further developments is conceivable and known in the state of the art.

Air gaps 274 and/or 273, by means of which the magnetic interaction takes place without friction, are provided between the linear motor strings 250-1 and/or 250-2 and the sequences of magnets 272 and 271. The air gaps thereby extend, as shown, two-dimensionally both in the transport direction X as well as perpendicularly to the transport direction, i.e. in the shown direction Y. The further development displayed herein illustrates the case of a vertical arrangement of the secondary part 270. However, it is clear that the secondary part can also be disposed horizontally, for example by means of arranging a long stator above the transport elements 210 between the guiding rails 240-1 and 240-2. The shown direction Z shows here and in the following on one hand the perpendicular line to the carrier plate of the secondary part 270 and on the other hand a rotary axis for the $C_2$ symmetry mentioned further below.

Figure 3:
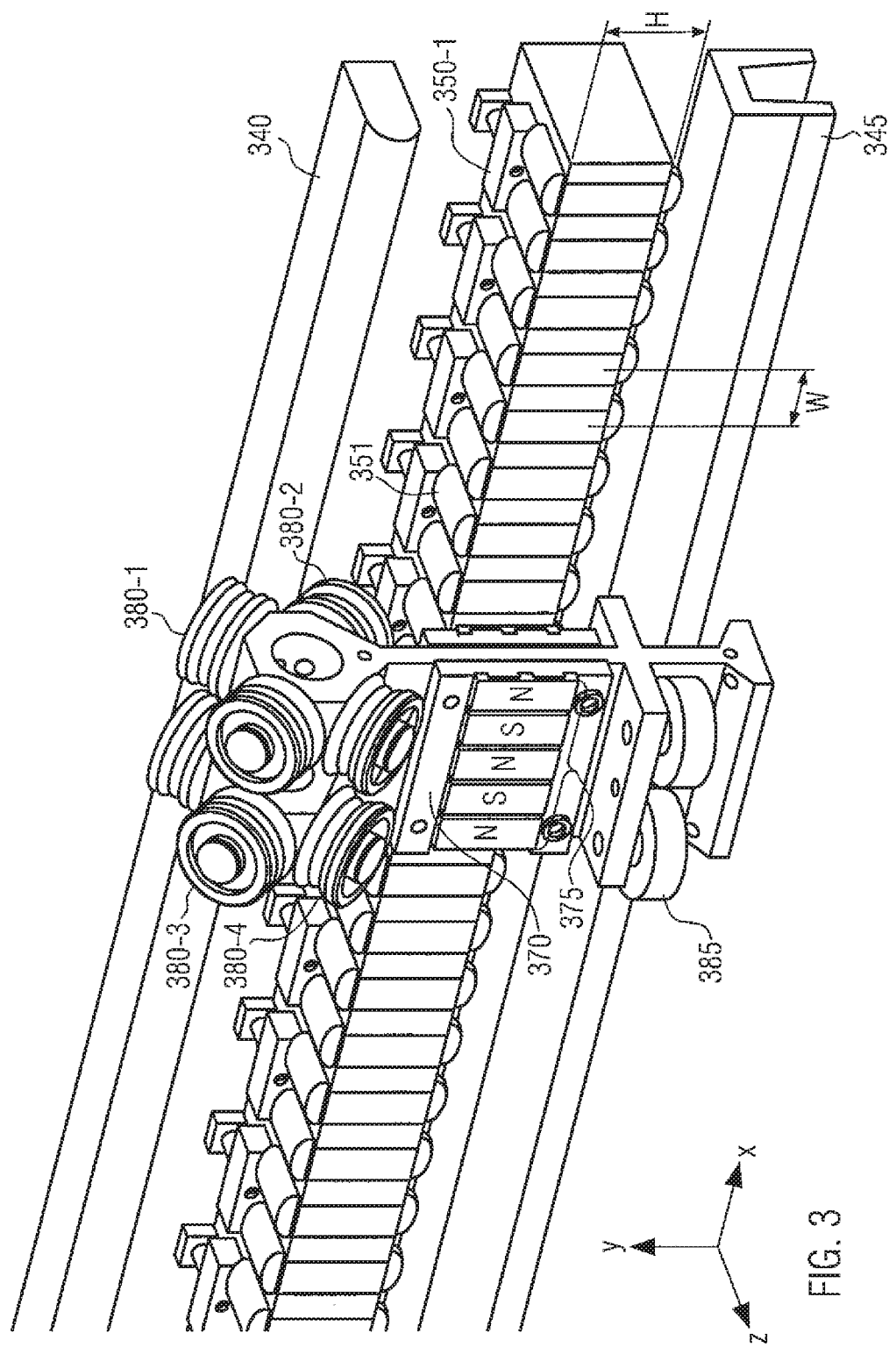
FIG. 3 shows a perspective view of the arrangement of the magnets of a secondary part of the state of the art.

FIG. 3 shows a perspective view of the arrangement of the magnets of a secondary part of the state of the art. Also here, a double-rail system with a two-sided linear motor is shown, wherein only a guiding rail 340 and a long stator 350-1 are shown for the sake of better clarity. As schematically displayed in FIG. 3, the long stator 350-1 has a series of coils 351 with a height H that is perpendicular to the transport direction, i.e. in the Y-direction, that are disposed at a distance W from one another along the long stator. The alternating magnetic fields of the coils 351 interact in this context with the permanent magnets and/or non-switching electromagnets, which are disposed with an alternating polarity N and/or S in a row, i.e. sequence 375, of the secondary part 370 that is shown here in the vertical configuration as well. The secondary part 370 is thereby a part of a transport element that is installed movably by means of rollers 380-1 to 380-4 on guiding rails 340 and in addition supported on the running rails 345 by means of support rollers 385.

Based on FIG. 3, it can be seen that on one hand the expansion of the magnets of the sequence 375 corresponds in the Y-direction to the height H of the coils 351 and that on the other hand the longitudinal extension of the sequence 375 in the transport direction X constitutes an absolute lower limit for the minimal attainable transport spacing.

Figure 4:
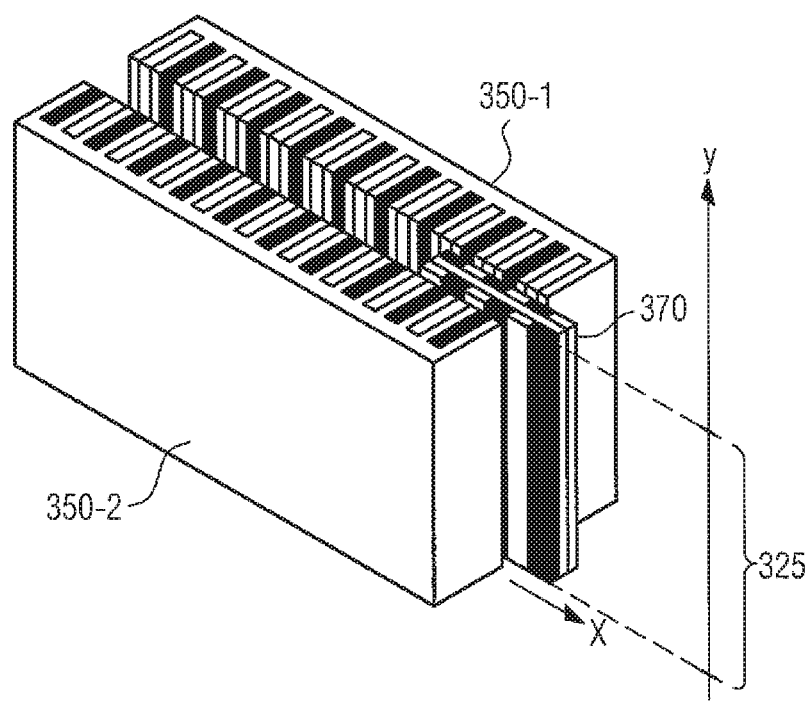
FIG. 4 schematically shows the area perpendicular to the transport direction that is occupied by the magnets of the secondary part in the state of the art.

FIG. 4 schematically shows the area perpendicular to the transport direction that is occupied by the magnets of the secondary part in the state of the art. Also here, a two-sided linear motor with parallel long stators 350-1 and 350-2 between which the secondary part 370 moves is shown once again. The extension of the magnets of the secondary part 370 in the Y-direction, i.e. perpendicularly to the transport direction X, occurs in this process in a way that they occupy the same area 325 that is also occupied by the indicated poles of the long stators 350-1 and 350-2.

Figure 5:
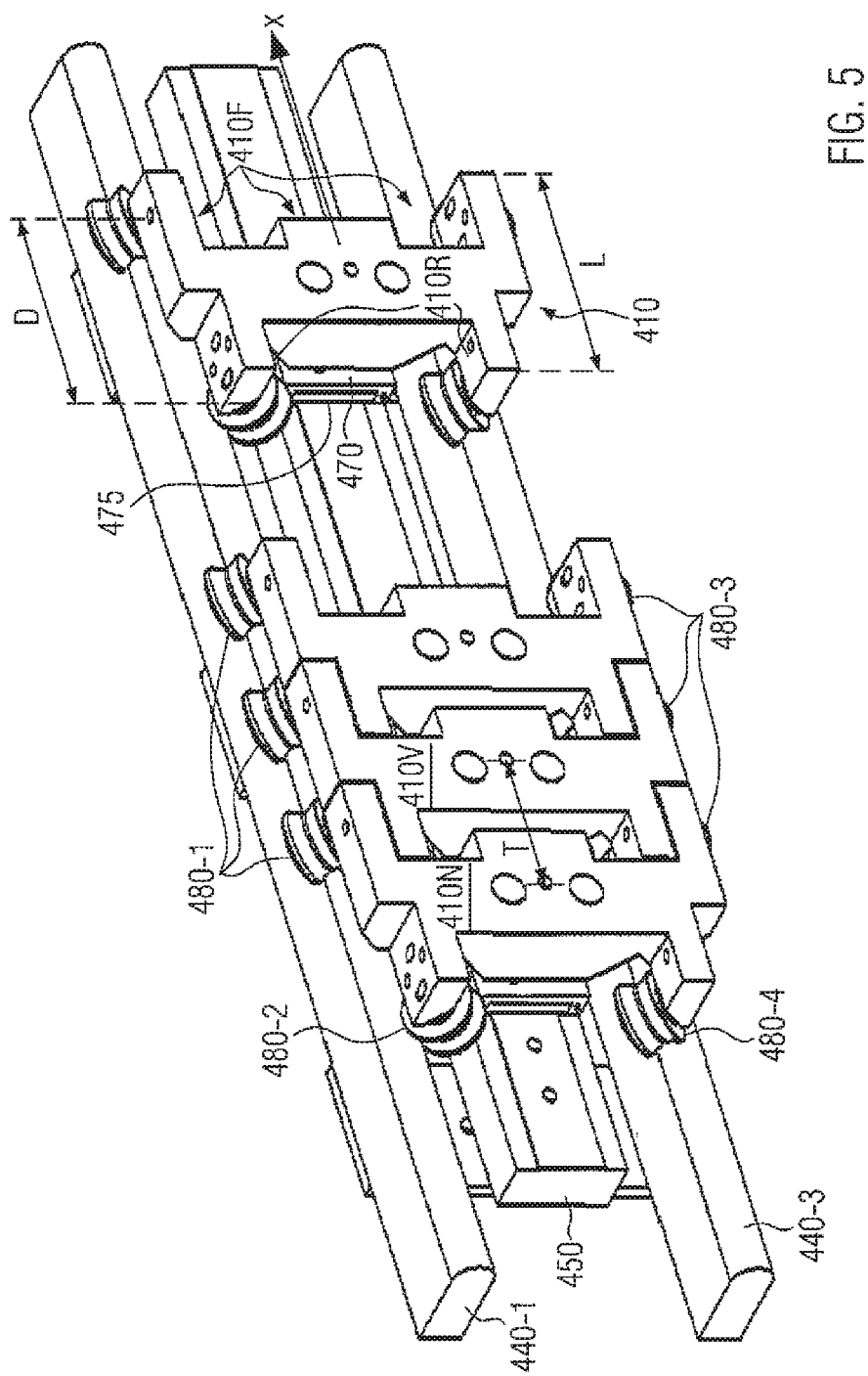
FIG. 5 shows an exemplary embodiment of the chassis of a linear transport system according to embodiments of the present disclosure.

FIG. 5 shows an exemplary embodiment of the formation of transport elements of a linear transport system according to embodiments of the present disclosure. In the shown, non-exhaustive further development, the transport elements 410 are installed by means of guiding rollers 480-1 to 480-4 on two guiding rails 440-1 and 440-3 that are guided in parallel, wherein a long stator 450 is arranged between the guiding rails. The exemplary display shows a one-sided linear motor in which the transport elements 410 are held laterally on the guiding rails by the vertically oriented long stator 450 through magnetic interaction with the magnets of the sequence 475 of the secondary part 470 of the transport elements 410. However, it is clear that the present disclosure is not limited to this arrangement. Of course, the transport elements 410 can also be guided on both sides and also be driven in a two-sided way. Likewise, the shown configuration can be rotated into a horizontal plane so that the transport elements 410 are moved like wagons on the double-rails system 440-1 and 440-3.

For the formation of the chassis, it is only relevant that the front sides 410F and back sides 410R of the transport elements 410 are formed in a way that the transport elements can be driven into one another to the extent that there will be a minimal attainable transport spacing T that is smaller than the longitudinal extension L of the transport elements. The front and the back side 410F and/or 410R of a transport element 410 are hereby defined based on the preferred transport direction X that can be derived from the arrangement of the transport system in the container treatment facility. The descriptions that relate in this disclosure to the front and the back side, however, can also be transferred without restriction to transport elements that are rotated by 180 degrees.

The profile and/or the contour of the transport element 410, which is reduced to the chassis for the sake of clarity, in a plane, which contains the transport direction X and which is parallel to the plane that is spread out by the guiding rails 440-1 and 440-3, is now no longer essentially rectangular but rather characterized by protrusions and recesses that can be driven into one another as shown in FIG. 5. In this context, a trailing transport element 410N can be driven towards a leading transport element 410V to the extent that that the minimal attainable transport spacing T is smaller than the maximum longitudinal extension L of the transport elements, i.e. that it even becomes smaller than the distance D of the guiding rollers 480-1 and 480-2. In the further development displayed herein, this distance D arises as the maximum distance of two random bearing elements in the transport direction X. The possible overlap of the front and back sides of the chassis of the transport elements enables a reduced transport spacing T while the distance D of the bearing elements is increased at the same time. Therefore, both the container throughput as well as the stability of the guiding can be increased while the wear of the bearing elements can be reduced. For example, a minimal transport spacing of 40 to 60 mm can be achieved for transport elements with a longitudinal extension of 90 to 110 mm. The transport elements can thereby be formed in such a way that the minimal attainable transport spacing T is smaller than 85% of the longitudinal extension, preferably smaller than 55%, particularly preferably smaller than 40% of the longitudinal extension L of the transport elements.

Figure 6:
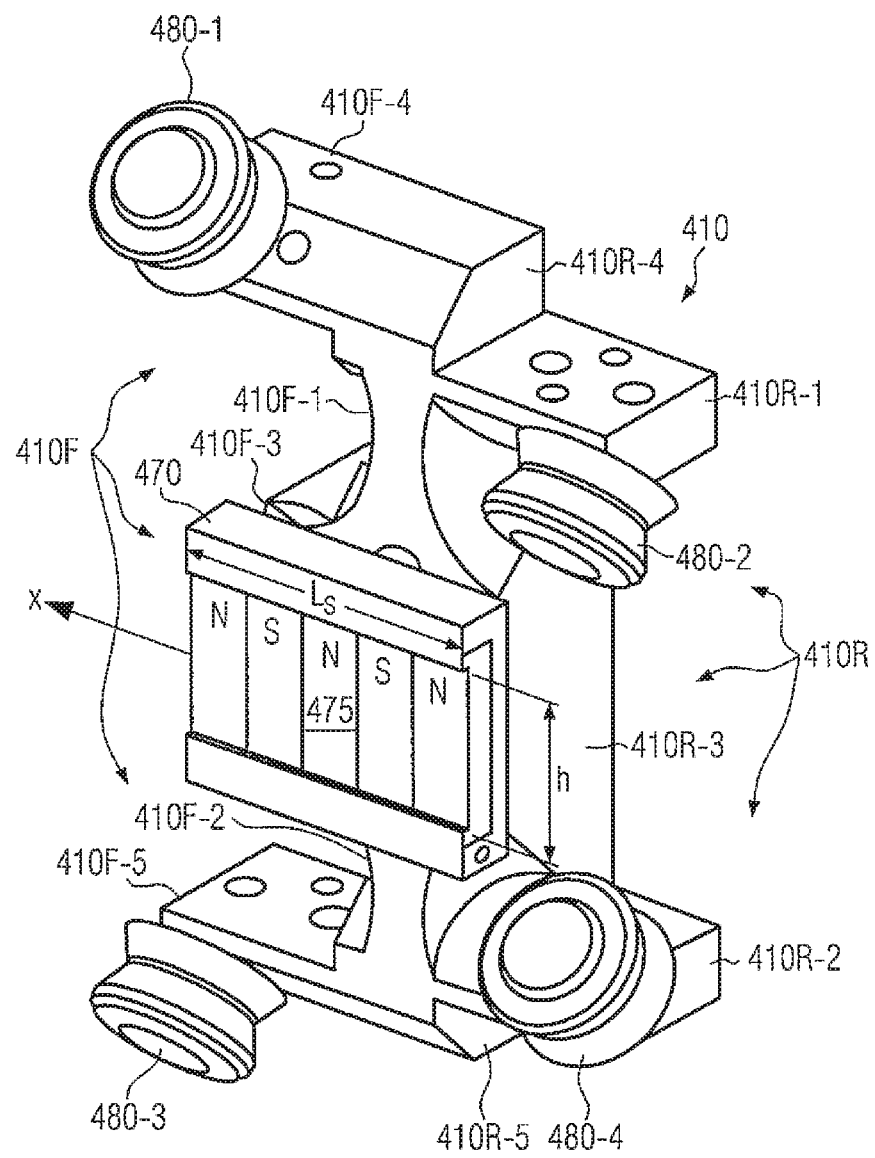
FIG. 6 shows a detailed drawing of the chassis of a transport element from FIG. 5.

The mentioned possible interlocking of front side 410F and back side 410R of a transport element can be understood better based on the detailed drawing of a transport element according to embodiments of the present disclosure in FIG. 6. Besides the recesses 410F-1 and 410F-2, the front side 410F has several protrusions 410F-3 to 410F-5. Accordingly, the back side has protrusions 410R-1 and 410R-2 and recesses 410R-3 to 410R-5 that are designed respectively. In this context, the recesses and protrusions are formed in a way that the protrusions 410F-3 to 410F-5 of the front side 410F can be driven into the recesses 410R-3 to 410R-5 of the back side 410R and vice versa that the protrusions 410R-1 and 410R-2 of the back side 410R can be driven into the recesses 410F-1 and 410F-2 of the front side 410F. The guiding rollers 480-1 and 480-3 and/or 480-2 and 480-4 are thereby arranged on the protrusions 410F-4 and 410F-5 as well as 410R-1 and 410R-2 in order to achieve a largest possible distance D of the bearing elements. To prevent the guiding rollers 480-1 and 480-3 of the front side 410F from restricting one another while the transport elements 410 are driving into one another, they can in addition be tilted by 90 degrees in relation to the guiding rails 480-2 and 480-4 of the back side 410R as shown in FIG. 6. In addition, this allows in a simple way that respectively two guiding rollers 480-1 and 480-2 and/or 480-3 and 480-4 can be guided on the same guiding rail, which simplifies the overall structure.

The secondary parts 470 of the transport elements 410 shown in the FIGS. 5 and 6 are equipped for the purpose of demonstration with a sequence of 475 magnets as it is known in the state of the art. The shown sequence comprises without restriction 475 magnets, more precisely five magnetic poles of alternating polarity in a row with a longitudinal extension $L_S$ and the height h, wherein the height h corresponds to the height of the coils of the long stator 450. In order to enable a further reduction of the minimal attainable transport spacing T, even below the longitudinal extension $L_S$, both the formation of the magnets of the sequence and their arrangement as well as the formation of the secondary part are changed according to embodiments of the present disclosure in such a way that successive secondary parts can be driven into one another. Exemplary further developments of this type are shown in the FIGS. 7 to 9.

Figure 7:
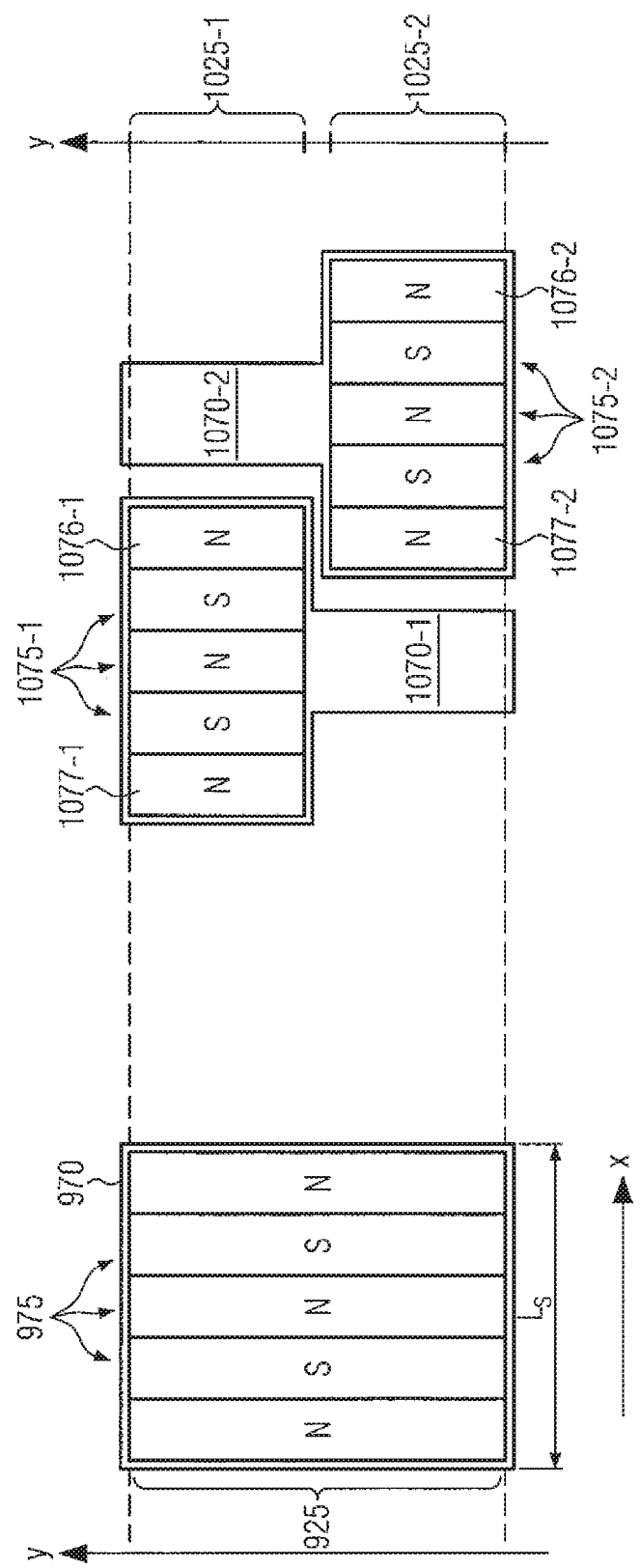
FIG. 7 shows a first exemplary further development of the sequence of magnets and of the secondary part according to embodiments of the present disclosure.

FIG. 7 shows a first exemplary further development of the sequence of magnets and of the secondary part according to embodiments of the present disclosure. For comparison, a secondary part 970 with a sequence 975 of magnets of the state of the art is displayed in this Figure as well as in the FIGS. 8 and 9 on the left side. The magnets of the sequence 975 thereby extend over the whole area 925, which is occupied by the coils of the long stator, in the Y-direction, i.e. perpendicularly to the transport direction X.

On the right side of FIG. 7, a first exemplary further development of the sequence of magnets and of the secondary part according to embodiments of the present disclosure is shown. Here, the plurality of transport elements disintegrates into two groups that have respectively one secondary part 1070-1 of the first type and a secondary part 1070-2 of the second type. In the transport flow, the transport elements from the two groups are arranged alternatingly in order to enable the secondary parts 1070-1 and 1070-2 of successive transport elements to drive into one another as shown in the Figure. In relation to the magnets of the sequence 975 of the state of the art, the magnets of the sequences 1075-1 and 1075-2 according to embodiments of the present disclosure are reduced in their height to less than half. Alternatively, the height of one part of the magnets can be reduced by less than half while the height of the other part of the magnets can be reduced by more than half. In this context, the sequences 1075-1 and 1075-2 are arranged on the respective transversal part of the essentially T-shaped secondary parts 1070-1 and 1070-2 in such a way that the magnets 1076-1 and 1077-2 of adjacent sequence ends occupy overlap-free areas 1025-1 and/or 1025-2 in a perpendicular direction to the transport direction. It is clear that also other forms, in particular rectangular forms, of the secondary parts are possible and can be used depending on the formation of the linear motor drive. As shown in the Figure, these two areas 1025-1 and 1025-2 are separated from one another by a certain distance in order to avoid an undesirably strong magnetic interaction between the magnets 1076-1 and 1077-2.

Due to the occupied areas 1025-1 and 1025-2 being overlap-free, the secondary parts 1070-1 and 1070-2 can be driven towards one another so closely that the magnets 1076-1 and 1077-2 of the adjacent sequence ends are arranged directly underneath one another, i.e. in alignment. Hence, both magnets 1076-1 and 1077-2 interact in the shown position with the same winding of the long stator (that is not displayed). The transport elements that belong to the secondary parts 1070-1 and 1070-2 can consequently be guided synchronously with a minimal spacing, practically as a train of transport elements. In the shown further development, all magnets of a sequence 1075-1 and/or 1075-2 occupy the same area 1025-1 and/or 1025-2 so that also larger overlaps are conceivable in case of an appropriate formation of the secondary parts 1070-1 and 1070-2 and longer sequences. Due to the alternating polarity, preferably always an uneven number of magnets overlap in this process so that always poles of the same type are located on top of one another. In the displayed configuration, the last magnet 1077-1 of the sequence 1075-1 can overlap with the first magnet of a trailing transport element (not displayed). Likewise, the first magnet of 1076-2 of the sequence 1075-2 can overlap with the last magnet of a leading transport element (not displayed). This way, entire chains of transport elements can be formed.

Alternatively, also an even number of magnets can overlap. In this case, however, the polarity of the magnets of successive transport elements is inverted. For example, a N-S-N-S-N combination of a sequence of five 1075-1 is followed by a S-N-S-N-S combination of another sequence of five 1075-2.

Figure 8:
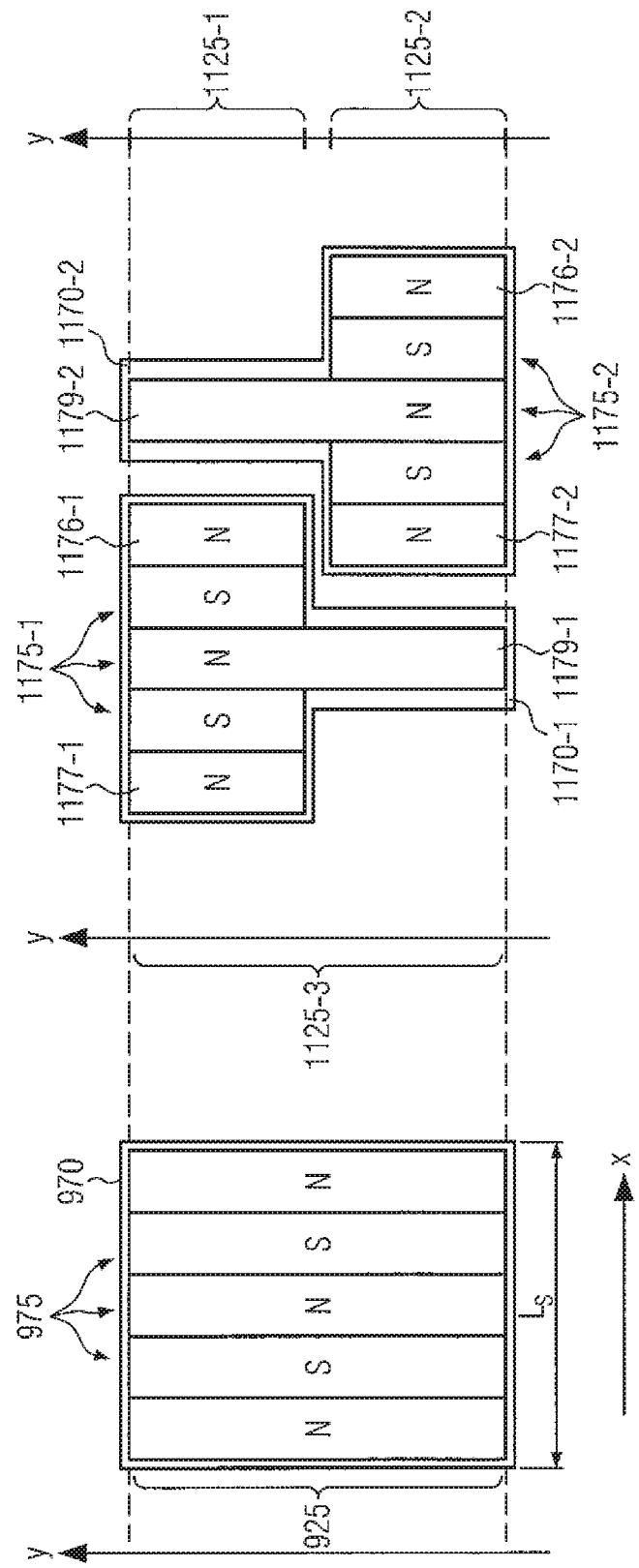
FIG. 8 shows an alternative further development of the sequence of magnets and of the secondary part according to embodiments of the present disclosure.

FIG. 8 shows an alternative further development of the sequence of magnets and of the secondary part according to embodiments of the present disclosure. Also here, the secondary parts 1170-1 and 1170-2 essentially have a T-form and are rotated by 180 degrees around a Z-axis between successive secondary parts. Also here, the end magnets 1176-1 and 1177-1 of the sequence 1175-1 and the end magnets 1176-2 and 1177-2 of the sequence 1175-2 occupy overlap-free areas 1125-1 and/or 1125-2 in a perpendicular direction to the transport direction. In contrast to the further development of FIG. 7, however, the central magnet 1179-1 and/or 1179-2 is formed over the entire height 1125-3 of the respective secondary part and consequently occupies both the area 1125-1 as well as the area 1125-2, as well as the segment between the two areas. A central magnet prolonged this way has no effect on the minimal transport spacing as also in this case the magnets 1176-1 and 1177-2 of adjacent sequences can be arranged on a line, but increases the propulsion force on the transport element. In case of longer sequences, more central magnets can be formed accordingly with a full height 1125-3.

Figure 9:
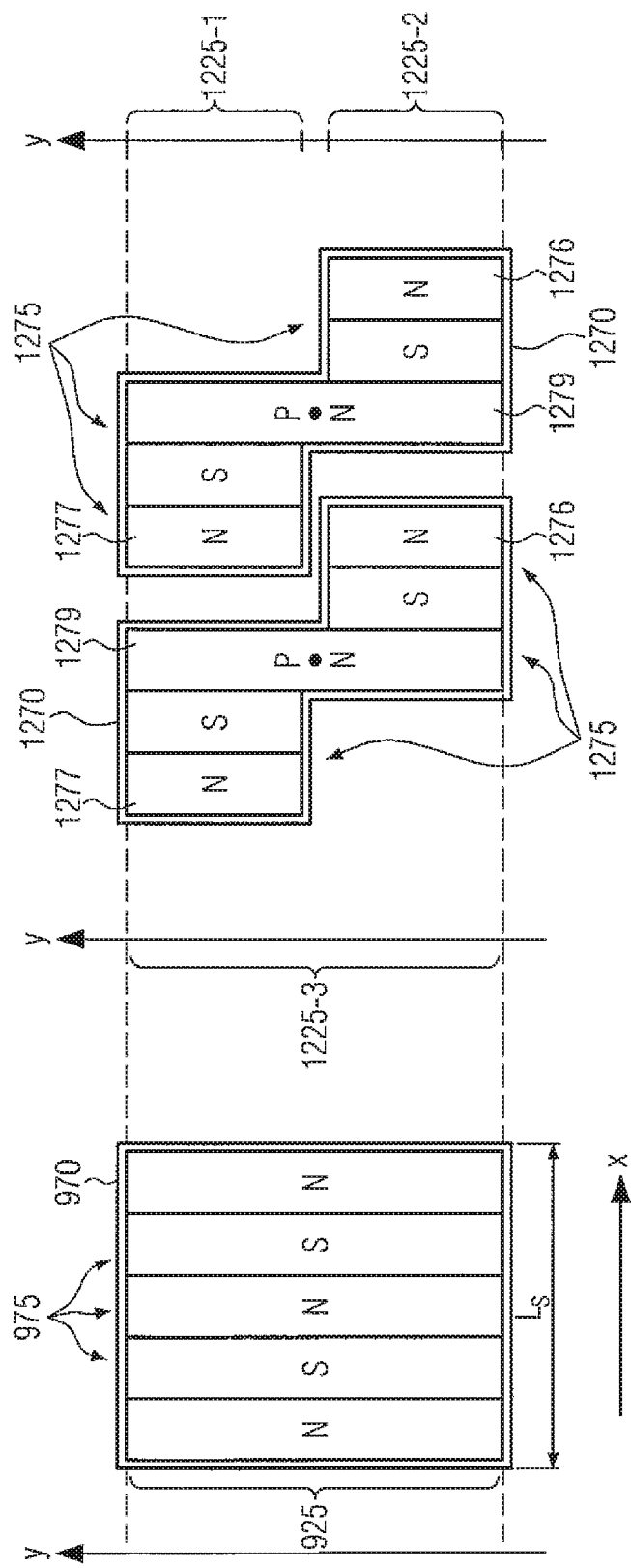
FIG. 9 shows a further alternative further development of the sequence of magnets and of the secondary part according to embodiments of the present disclosure.

FIG. 9 shows another alternative further development of the sequence of magnets and of the secondary part according to embodiments of the present disclosure. Here, the secondary parts 1270 of all transport elements are formed identically and have a stair- or Z-form. This means that the central magnet 1279, or multiple central magnets in case of longer sequences, extend over the full height 1225-3 while the remaining magnets of the sequences 1275 only have a reduced height. Due to the stair-form, the front magnets in this non-limiting illustration 1276 consequently occupy the second area 1225-2 and the rear magnets 1277 occupy the first area 1225-2, wherein the two areas are overlap-free as before. Accordingly, the end magnets 1276 and 1277 of adjacent sequences 1275 can be driven over one another. Due to its inversion symmetry around the point P, the shown formation of the magnets is particularly well suited for wedge-shaped or angular chassis with a horizontally aligned secondary part as shown for example in FIG. 10. In addition, this similar formation of the secondary parts of all transport elements allows for individual transport elements to be insertable in or dischargeable from the flow of transport elements in any way without having a negative influence on the minimal attainable transport spacing.

Figure 10:
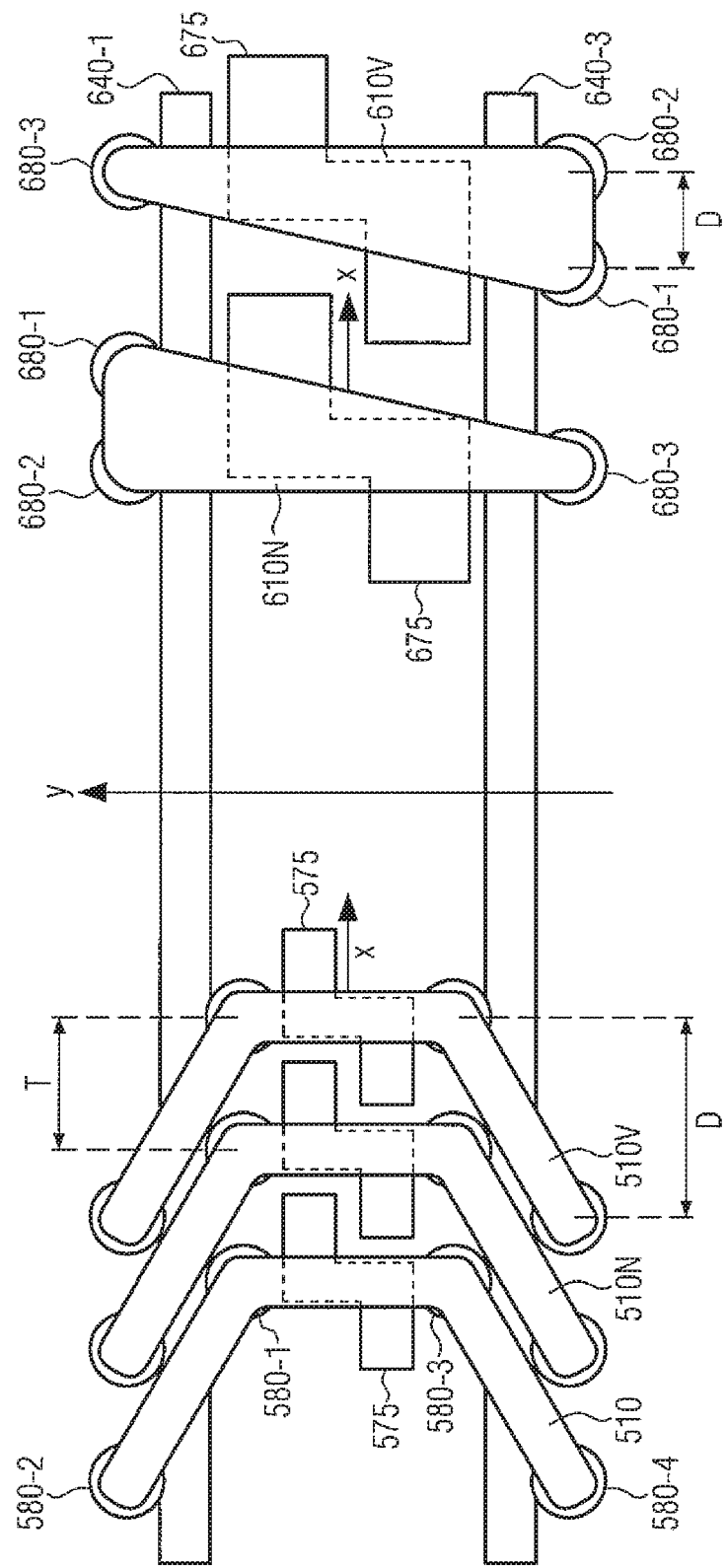
FIG. 10 shows two exemplary further developments of the arrangement of the magnet sequences on the chassis of the transport elements according to embodiments of the present disclosure.

FIG. 10 schematically displays two exemplary further developments of the arrangement of the sequences of magnets on the chassis of the transport elements according to embodiments of the present disclosure. For the sake of simplicity, the illustration is limited to the chassis of the transport elements and the sequences arranged on said chassis. It is clear that further required elements such as carrier plates, gripping elements and the like can be arranged at a suitable point on the transport elements. In addition, a horizontal arrangement of the linear motor, in which the long stator (not displayed) is disposed underneath the transport elements and between the two guiding rails of the double-rail system, was chosen to enable a simultaneous illustration of chassis and sequence in a top view. It is clear that the illustrated further developments can be adapted to the vertical case described above as part of the present disclosure.

On the left side of FIG. 10, transport elements 510 are shown whose front side and/or back side has an essentially convex and/or concave form. The shown transport elements 510 are installed on a first guiding rail 640-1 by means of guiding rollers 580-1 and 580-2 that actuate on both sides and on a second guiding rail 640-3 by means of guiding rollers 580-3 and 580-4 that actuate on both sides. The sequences 575 of magnets are formed in a stair-shaped way in the displayed further development and fastened on the central part of the chassis. Due to the U-shaped design of the chassis and the stair shape of the magnet sequences, a trailing transport element 510N can be driven into a leading transport element 510V to the extent that the minimum attainable transport spacing T is considerably smaller than the distance D of the bearing elements in the transport direction X. For example, a minimum spacing T of 40 mm can be achieved in case of a distance D of 60 mm.

A slightly different further development of the transport elements is shown on the right side of FIG. 10. Here, the chassis of the transport elements are formed in an angular way, wherein successive transport elements 610N and 610V are always arranged on the guiding rails 640-1 and 640-3 in a way as to be rotated by 180 degrees. Hence, the trailing transport element 610N is installed exemplarily on the first guiding rail 640-1 with two rollers 680-1 and 680-2 and on the second guiding rail 640-3 with only one roller 680-3 whereas the leading transport element 610V is installed on the second guiding rail 640-3 with two rollers 680-1 and 680-2 and on the first guiding rail 640-1 with only one roller 680-3. The distance D of the bearing elements is defined in this context as the maximum distance of two rollers. Also here, stair-shaped magnet sequences 675 are disposed on the transport elements. This has the advantage that, due to the $C_2$ symmetry of the sequences 675, only one type of transport elements has to be manufactured, which are then arranged on the transport track in a way as to be rotated alternatingly by 180 degrees. Due to the wedge-shaped structure of the transport elements above the rollers 680-1 to 680-3 that are arranged in an angular way, a transport spacing T, which is smaller than the longitudinal extension of the transport elements that is in this case given by the longitudinal extension of the secondary parts, can be achieved. In this process, the transport elements according to this further development are always driven into one another in pairs.

Figure 11:
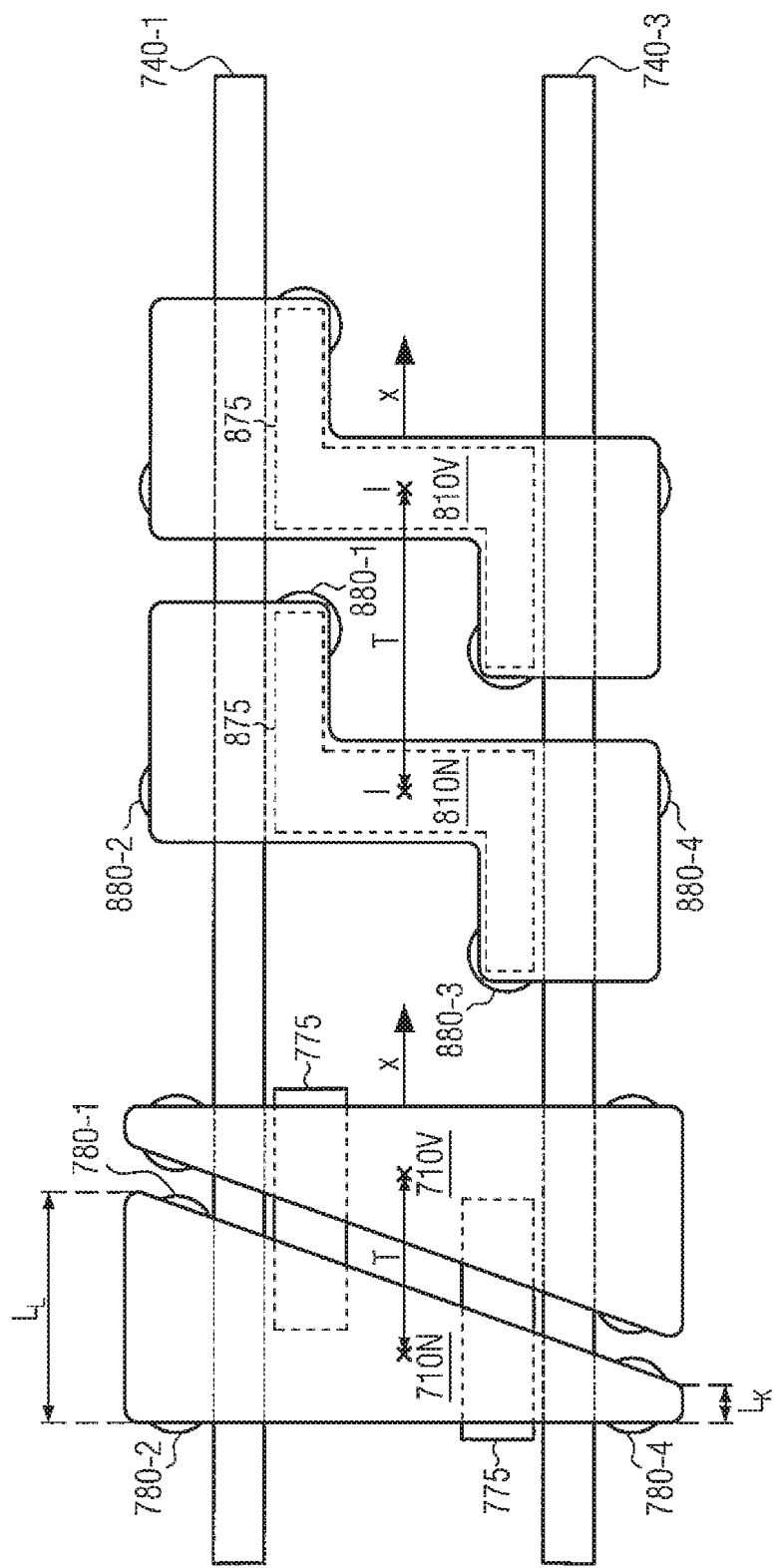
FIG. 11 shows two alternative further developments of the arrangement of the magnet sequences on the chassis of the transport elements according to embodiments of the present disclosure.

A similar further development with a wedge-shaped chassis is displayed schematically in the left part of FIG. 11. Also here, the transport elements are installed on the first guiding rail 740-1 by means of two guiding rollers 780-1 and 780-2 while they are installed on the second guiding rails 740-3 with only one guiding roller 780-3. The transport elements consequently have a long longitudinal side with the extension $L_L$ and a short longitudinal side with the extension $L_K$. The distance D of the bearing elements arises as the distance of the rollers 780-1 and 780-2 as this is the largest distance in the longitudinal direction. In this further development, sequences 775 of magnets are used in which all magnets of the sequence of a specific transport element occupy the same area. For example, the magnets are—as shown herein—arranged as a linear sequence that is disposed on the transport elements between the guiding rails 740-1 and 740-3 in a way as to be shifted in relation to the center. By rotating a transport element by 180 degrees, the sequence changes from the first into the second area so that the sequences of transport elements rotated by 180 degrees as shown here do not hamper one another.

For this reason, the transport elements in pairs can be driven into one another to the extent that the transport spacing T between corresponding points of the trailing transport element 710 and of the leading transport element 710V is visibly smaller than the extension $L_L$ of the long side. In addition, the spacing between two successive pairs of transport elements rotated by 180 degrees is also smaller than their longitudinal extension so that there will be a transport flow with a high throughput.

The right side of FIG. 11 eventually displays a further development in which the chassis of the transport elements have a stair and/or Z-shape just as their magnet sequences 875. At least in relation to the arrangement of the guiding rollers 880-1 to 880-4, the chassis is formed inversion-symmetrically in relation to an inversion point I so that the chassis has a $C_2$ symmetry. Likewise, each sequence 875 also has an inversion symmetry with regard to the inversion point I. In this case, the maximum distance D of the bearing elements is formed for the guiding rollers 880-1 and 880-3 that are arranged on different guiding rails 740-1 and 740-3, which is also in this case larger than the minimal attainable spacing T between the trailing transport element 810N and the leading transport element 810V. The special arrangement of the guiding rollers ensures a particularly high stability against torques of this chassis. In addition, individual transport elements can be inserted into the flow of transport elements and discharged from said flow in any way.

A plurality of further embodiments is conceivable as part of the present disclosure whose minimal attainable transport spacing is smaller than the longitudinal extension of the transport elements and in particular smaller than the longitudinal extension of the secondary parts. In this context, the further developments that are explicitly displayed and described herein can be adapted according to the requirements of the process track without infringing the described fundamental principle.

What is claimed is:

1. A transport system for transport of containers in a container treatment facility, comprising:
    a transport track comprising at least one long stator of a linear motor; and
    a plurality of transport elements for transporting one or multiple containers in a transport direction,
    wherein the plurality of transport elements are arranged movably on the transport track and each respective transport element of the plurality of transport elements comprises at least one secondary part for magnetic interaction with the at least one long stator,
    wherein each respective transport element of the plurality of transport elements comprises at least one sequence of magnets with an alternating polarity arranged in a longitudinal direction on the at least one secondary part in such a way that the respective transport element can be moved along the transport track through magnetic interaction of the magnets of the at least one sequence of magnets with the long stator, the longitudinal direction being parallel to the transport direction, and
    wherein magnets of adjacent sequence ends of respective sequences of magnets of two successive transport elements of the plurality of transport elements are dimensioned and arranged so as to occupy non-overlapping areas in projection onto a transversal direction, the transversal direction being perpendicular to the transport direction.

2. A transport system according to claim 1, wherein the plurality of transport elements comprises at least a first group of transport elements and a second group of transport elements, wherein the magnets of at least sequence ends of the at least one sequence of magnets of the first group of transport elements occupy a first area in projection onto the transversal direction, and wherein the magnets of at least sequence ends of the at least one sequence of magnets of the second group of transport elements occupy a second area in projection onto the transversal direction that is overlap-free with the first area.

3. A transport system according to claim 2, wherein all of the magnets of the at least one secondary part of the first group of transport elements occupy the first area, and all of the magnets of the at least one secondary part of the second group of transport elements occupy the second area.

4. A transport system according to claim 2, wherein a number of magnets in each of the at least one sequence of magnets is uneven, and wherein at least a central magnet of each of the at least one sequence of magnets of the at least one secondary part of the first group of transport elements occupies at least the first area and at least a central magnet of each of the at least one sequence of magnets of the at least one secondary part of the second group of transport elements occupies at least the second area.

5. A transport system according to claim 1, wherein for each of the at least one sequence of magnets of the at least one secondary part of the transport elements, the magnets of a first sequence end occupy a first area in projection onto the transversal direction and the magnets of a second sequence end occupy a second area in projection onto the transversal direction that does not overlap with the first area.

6. A transport system according to claim 5, wherein a number of the magnets in each of the at least one sequence of magnets is uneven, and wherein respectively at least a central magnet of each of the at least one sequence of magnets occupies at least the first and the second area.

7. A transport system according to claim 6, wherein exactly the central magnet occupies at least the first and the second area, wherein the magnets between the central magnet and the first sequence end occupy the first area, and wherein the magnets between the central magnet and the second sequence end occupy the second area.

8. A transport system according to claim 1, wherein the long stator has two or more linear motor strings that correspond to the non-overlapping areas, and wherein the two or more linear motor strings are arranged in parallel and can be controlled independently of one another.

9. A transport system according to claim 1, further comprising:
    a mechanical acceleration unit that is arranged on the transport track in such a way that passing transport elements can be accelerated or decelerated systematically through mechanical encroachment with the mechanical acceleration unit.

10. A transport system according to claim 9, wherein the mechanical acceleration unit comprises at least one of a driven roller or a driven conveyor belt.

11. A transport system according to claim 1, wherein front and back sides of the transport elements as well as the at least one secondary par of the transport elements are formed in such a way that the transport elements can be driven into one another to an extent that there will be a minimal attainable transport spacing that is smaller than a longitudinal extension of the transport elements.

12. A transport system according to claim 11, wherein secondary parts of two successive transport elements are formed in such a way, and wherein the magnets of the secondary parts of the two successive transport elements are arranged on the respective at least one secondary part in such a way, that the at least one secondary part of a trailing transport element can be driven so closely towards the at least one secondary part of a leading transport element that the magnets of the adjacent sequence ends are aligned in the transversal direction.

13. A transport system according to claim 11, wherein the transport elements have a wedge shape or an angular shape, and wherein successive transport elements of the plurality of transport elements are arranged on the transport track in a way as to be rotated by 180 degrees.

14. A transport system according to claim 13, wherein for each transport element of the plurality of transport elements, all of the magnets of the at least one sequence of magnets of the respective at least one secondary part are arranged in such a way that they would occupy a same area in projection onto the transversal direction in case of an identical orientation on the transport track.

15. A transport system according to claim 11, wherein the transport elements respectively are supported by means of rollers on the transport track, and wherein an arrangement of the rollers is inversion-symmetric.

16. A transport system according to claim 15, wherein the arrangement of the magnets of the at least one secondary par of the transport elements is inversion-symmetric.

17. A transport system according to claim 1, wherein the magnets in the at least one sequence of magnets each comprise at least one of permanent magnets or electromagnets.

* * * * *

UNITED STATES PATENT AND TRADEMARK OFFICE
CERTIFICATE OF CORRECTION

PATENT NO. : 10,759,613 B2
APPLICATION NO. : 16/061315
DATED : September 1, 2020
INVENTOR(S) : Michael Neubauer Page 1 of 1

It is certified that error appears in the above-identified patent and that said Letters Patent is hereby corrected as shown below:

In the Claims

In Claim 11, Column 23, Line 1, after "secondary" delete "par" and insert --part--

In Claim 16, Column 24, Line 13, after "secondary" delete "par" and insert --part--

Signed and Sealed this
Twenty-ninth Day of September, 2020

Andrei Iancu
*Director of the United States Patent and Trademark Office*